(12) United States Patent
Lin et al.

(10) Patent No.: US 8,835,522 B2
(45) Date of Patent: Sep. 16, 2014

(54) POLYURETHANE POLYMER HAVING BISPHENOL GROUP AND PHOTOIMAGEABLE COMPOSITION CONTAINING THE SAME

(75) Inventors: Gerng-Horng Lin, Kaohsiung (TW);
Hui-Kuan Mao, Kaohsiung (TW);
Ming-Hsiung Yang, Kaohsiung (TW);
Feng-Chih Tsai, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 0 days.

(21) Appl. No.: 11/728,500

(22) Filed: Mar. 26, 2007

(65) Prior Publication Data
US 2007/0225467 A1 Sep. 27, 2007

(30) Foreign Application Priority Data

Mar. 27, 2006 (TW) ................. 95110595 A

(51) Int. Cl.
*C08G 18/67* (2006.01)
*C08G 18/73* (2006.01)
*C09D 175/16* (2006.01)
*C08G 18/32* (2006.01)

(52) U.S. Cl.
CPC .............. *C08G 18/73* (2013.01); *C09D 175/16* (2013.01); *C08G 18/3215* (2013.01); *C08G 18/672* (2013.01)
USPC .................... 522/97; 522/90; 522/92; 522/96; 430/271.1; 430/421

(58) Field of Classification Search
USPC ......... 430/271.1; 428/421; 522/90, 92, 97, 96
See application file for complete search history.

(56) References Cited

U.S. PATENT DOCUMENTS

| 5,571,659 | A  | * | 11/1996 | Noguchi et al. | ........... | 430/284.1 |
| 6,319,653 | B1 | * | 11/2001 | Barr | ........................... | 430/284.1 |
| 6,897,011 | B2 | * | 5/2005 | Kumazawa et al. | .......... | 430/323 |

FOREIGN PATENT DOCUMENTS

EP 1 336 630 A2 8/2003 ............. C08G 18/62

* cited by examiner

*Primary Examiner* — Michael L Leonard
(74) *Attorney, Agent, or Firm* — Drinker Biddle & Reath LLP

(57) ABSTRACT

The present invention provides a polymer having the structure of formula (I)

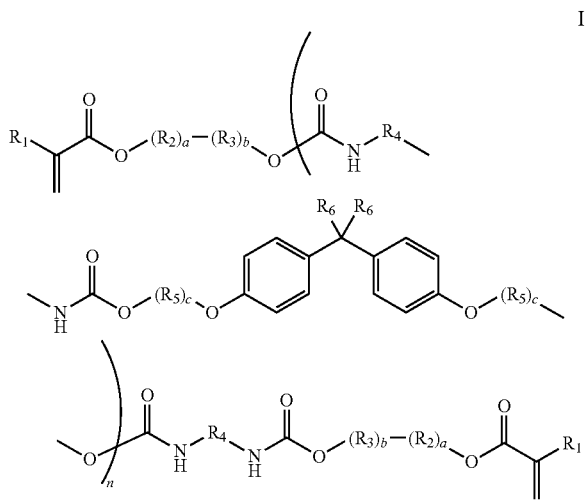

wherein n, $R_1$, $R_2$, $R_3$, $R_4$, $R_5$, $R_6$, a, b and c are as defined in the specification. The present invention also provides a negative-acting photoimageable composition comprising the above-mentioned polymer of formula (I), which is suitable for the fabrication of printed circuit boards.

14 Claims, No Drawings

POLYURETHANE POLYMER HAVING BISPHENOL GROUP AND PHOTOIMAGEABLE COMPOSITION CONTAINING THE SAME

BACKGROUND OF THE INVENTION

1. Field of the Invention

The present invention relates to a polymer having the structure of formula (I) as given herein, and a negative-acting photoimageable composition comprising the polymer, which is capable of being developed in an aqueous alkaline solution. The photoimageable composition of the present invention can be used as a photoresist in the processes of acid electroplating, covering pores, acid and alkaline etching, gold plating, electroless nickel immersion gold (ENIG) for the production of printed circuit boards.

2. Description of the Prior Art

In photoimageable compositions applied to printed circuit boards, different constituents result in different applications of the photoimageable compositions. Better flexibility and toughness may enhance the tensile properties and ductility of the photoimageable compositions. Generally, printed circuit boards have orifices, enabling the circuit on one side of the boards to be connected to the circuit on the other side. The photoimageable composition layer must cover these orifices during the process, and since the orifices in the printed circuit boards are becoming bigger and bigger gradually, the covering strength is more and more important. In the past, the photoimageable compositions were poor in the capacities of electroplating resistance, tensile, alkaline etching resistance, gold plating resistance, and nickel plating resistance, thus the appliance thereof in the printed circuit boards was susceptible to be limited. In the specification of U.S. Pat. No. 4,555,552, it is mentioned that after being mixed with elastic resins, the polyurethane polymerized from an alcohol compound having an aromatic ring and a diisocyanate may enhance the tensile strength and ductility. It has been found after extensive studies that the polyurethane that has a bisphenol group is one of the important components which can improve the flexibility and toughness of the photoimageable composition, and will improve not only the tensile properties, but also the capacities of electroplating resistance, alkaline etching resistance, gold plating resistance, and nickel plating resistance, and thus increases the processability of the printed circuit boards.

Furthermore, in the specification of U.S. Pat. No. 6,322,951, it is mentioned that it has been found that the flexibility of a photoimageable composition of a printed circuit board is enhanced and even the ability of stripping is correspondingly improved, if the photoimageable composition contains a polyurethane (meth)acrylate having at least two alkoxy functional groups and one ring-opened lactone functional group.

The inventors utilize different properties of different functional groups to enhance different properties of photoimageable compositions by combining different functional groups, for example, adding an alkoxy functional group and an ring-opened lactone functional group to a polyurethane (meth)acrylate to increase the chain length, and thus to enhance the flexibility of the photoimageable composition; and, adding an aromatic ring functional group to the polyurethane (meth) acrylate to enhance the tensile strength and ductility of the photoimageable composition due to the rigidity of the aromatic ring. The polyurethane (meth)acrylate synthesized at the most preferred balance point of different properties can be used in photoimageable compositions for enhancing the capacities of electroplating resistance, covering pores, nickel/gold plating resistance, acid and alkaline etching resistance, and electroless nickel plating immersion gold resistance.

SUMMARY OF THE INVENTION

The main object of the present invention is to provide a novel polymer.

The another object of the present invention is to provide a negative-acting photoimageable composition containing the polymer, which can be used as a photoresist in the processes for producing printed circuit boards.

DETAILED DESCRIPTION OF THE INVENTION

Unless otherwise specified, the content percentages of all constituents disclosed in the specification are based on weight.

The polymer of the present invention has the structure of the following formula (I):

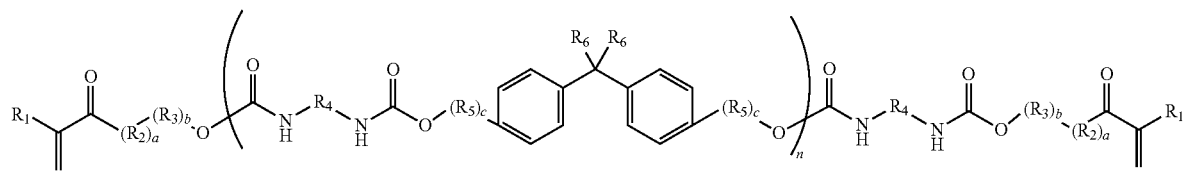

wherein:
- $R_1$ is hydrogen or methyl;
- $R_2$ is $C_{2-4}$ (preferably $C_{2-3}$) alkenyleneoxy;
- $R_3$ is $C_{3-10}$ (preferably $C_{3-7}$) lactone residue;
- $R_4$ is $C_{1-20}$ (preferably $C_{4-16}$)alkylene, alkenylene, alkynylene, cycloalkylene, or arylene ring group;
- $R_5$ is $C_{2-4}$ (preferably $C_{2-3}$)alkyleneoxy;
- $R_6$ is hydrogen, or $C_{1-10}$ (preferably $C_{1-6}$)alkyl, alkenyl, alkynyl, cycloalkyl, or aromatic ring group;
- n is an integer greater than or equal to 1, and preferably is an integer from 1 to 20;
- a is an integer from 1 to 10, and preferably is an integer from 1 to 7;
- b is an integer from 0 to 20, and preferably is an integer from 4 to 15;
- c is an integer from 0 to 10, and preferably is an integer from 2 to 7.

According to a preferred embodiment of the present invention, the polymer of the present invention has a weight average molecular weight between 4,000 and 20,000, preferably between 5,000 and 8,000.

The polymer of the present invention is obtained by the polymerization of the monomers of (a) a dihydric alcohol having a bisphenol group, (b) a diisocyanate, and (c) an acrylate alcohol compound.

The structure of the dihydric alcohol having a bisphenol group used in the present invention is shown in formula (II):

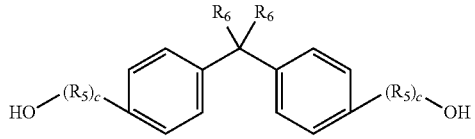

wherein, $R_5$, $R_6$, and c have the meanings as described above. According to a preferred embodiment of the present invention, $R_5$ is ethoxy and c is an integer from 2 to 7. Examples of the bisphenol dihydric alcohols suitable for the present invention include, but are not limited to, 4-(4-hydroxybenzyl)phenol, 4-(1-(4-hydroxyphenyl)ethyl)phenol, 4-(1-(4-hydroxyphenyl)propyl)phenol, 4-(1-(4-hydroxyphenyl)-2-methylpropyl)phenol, 4-(1-(4-hydroxyphenyl)-2,2-dimethylpropyl)phenol, 4-(1-(4-hydroxyphenyl)butyl)phenol, 4-(1-(4-hydroxyphenyl)-2-methylbutyl)phenol, 1,1-bis(4-hydroxyphenyl)ethene, 3,3-bis(4-hydroxyphenyl)propylene, 4,4-bis(4-hydroxyphenyl)butylene, 3,3-bis(4-hydroxyphenyl)butylene, 2,2-bis(4-hydroxyphenyl)propane (bisphenol A), 2,2-bis(4-hydroxyphenyl)butane, 3,3-bis(4-hydroxyphenyl)pentane, 2,2-bis(4-hydroxyphenyl)pentane, 4,4-bis(4-hydroxyphenyl)pentene, 3,3-bis(4-hydroxyphenyl)pentene, 3,3-bis(4-hydroxyphenyl)-1,4-pentadiene, bis(4-hydroxyphenyl)-cyclohexyl-methane, 1,1-bis(4-hydroxyphenyl)-1-cyclohexyl-ethane, 1,1-bis(4-hydroxyphenyl)-1-cyclohexyl-propane, 3,3-bis(4-hydroxyphenyl)-3-cyclohexyl-propylene, bis(4-hydroxyphenyl)-cyclopentyl-methane, 1,1-bis(4-hydroxyphenyl)-1-cyclopentyl-ethane, 1,1-bis(4-hydroxyphenyl)-1-cyclopentyl-propane, 3,3-bis(4-hydroxyphenyl)-3-cyclopentyl-propylene, bis(4-hydroxyphenyl)-phenyl-methane, 1,1-bis(4-hydroxyphenyl)-1-phenyl-ethane, 1,1-bis(4-hydroxyphenyl)-1-phenyl-propane, 3,3-bis(4-hydroxyphenyl)-3-phenyl-propylene, bis(4-ethylene glycol phenyl)methane, bis(4-diethylene glycol phenyl)methane, bis(4-triethylene glycol phenyl)methane, bis(4-tetraethylene glycol phenyl)methane, bis(4-pentaethylene glycol phenyl)methane, 2,2-bis(4-ethylene glycol phenyl)propane, 2,2-bis(4-diethylene glycol phenyl)propane, 2,2-bis(4-triethylene glycol phenyl)propane, 2,2-bis(4-tetraethylene glycol phenyl)propane, 2,2-bis(4-pentaethylene glycol phenyl)propane, 2,2-bis(4-hexaethylene glycol phenyl)propane, 2,2-bis(4-heptaethylene glycol phenyl)propane, bis(4-propylene glycol phenyl)methane, bis(4-dipropylene glycol phenyl)methane, bis(4-tripropylene glycol phenyl)methane, bis(4-tetrapropylene glycol phenyl)methane, bis(4-pentapropylene glycol phenyl)methane, 2,2-bis(4-propylene glycol phenyl)propane, 2,2-bis(4-dipropylene glycol phenyl)propane, 2,2-bis(4-tripropylene glycol phenyl)propane, 2,2-bis(4-tetrapropylene glycol phenyl)propane, 2,2-bis(4-pentapropylene glycol phenyl)propane, 2,2-bis(4-hexapropylene glycol phenyl)propane, 2,2-bis(4-heptapropylene glycol phenyl)propane. The above described bisphenol dihydric alcohols can be prepared in a polymerization reaction of a bisphenol as the main skeleton with one or more cyclic ethers (e.g., ethylene oxide or propylene oxide), cyclic ether compounds (e.g., epoxytetrahydrofuran or tetrahydrofuran), or the like.

The diisocyanate used in the present invention is shown in formula (III):

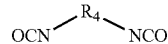

wherein, $R_4$ has the meaning as described above. The diisocyanates suitable for the present invention are $C_{1-20}$ (preferably $C_{4-16}$)alkyl, alkenyl, alkynyl, cycloalkyl, or aromatic ring groups. Examples of the suitable diisocyanates include, for example, but are not limited to: 4,4'-diphenyl methane diisocyanate (MDI), toluene diisocyanate (TDI), isophorone diisocyanate (IPDI), hexamethylene diisocyanate (HMDI), 2,2,4- or 2,4,4-trimethyl-hexamethylene diisocyanate (TMDI), bis(cyclohexyl)methylene diisocyanate ($H_{12}$MDI), and tetramethylene xylene diisocyanate (TMXDI).

The acrylate alcohol compound used in the present invention is shown in formula (IV):

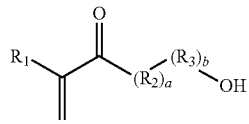

wherein, $R_1$, $R_2$, $R_3$, a, and b have the meanings as described above. This acrylate alcohol compound can be synthesized by the esterification of a compound having at least two hydroxy groups with acrylic acid, to form an acrylate with a hydroxy group. Examples of the acrylate alcohol compounds suitable for the present invention include, but are not limited to, ethylene glycol acrylate, ethylene glycol methacrylate, 1,2-propanediol acrylate, 1,2-propanediol methacrylate, 1,3-propanediol acrylate, 1,3-propanediol methacrylate, 1,4-butanediol acrylate, 1,4-butanediol methacrylate, diethylene glycol acrylate, diethylene glycol methacrylate, di(1,2-propanediol)acrylate, di(1,2-propanediol)methacrylate, triethylene glycol acrylate, triethylene glycol methacrylate, tri(1,2-propanediol)acrylate, tri(1,2-propanediol)methacrylate, tetraethylene glycol acrylate, tetraethylene glycol methacrylate, tetra(1,2-propanediol)acrylate, tetra(1,2-propanediol)methacrylate, pentaethylene glycol acrylate, pentaethylene glycol methacrylate, penta(1,2-propanediol)acrylate, penta(1,2-propanediol)methacrylate, hexaethylene glycol acrylate, hexaethylene glycol methacrylate, hexa(1,2-propanediol)acrylate, and hexa(1,2-propanediol)methacrylate. Alternatively, the acrylate alcohol compound can be synthesized according to the disclosure of U.S. Pat. No. 6,322,951, by reacting an alcohol having an acrylate constituent with a lactone having at least three carbons (which is, for example, but is not limited to, β-lactone, γ-lactone, ω-lactone, or ε-lactone) to form a polyester chain functional group, followed by the ester exchange and ring opening reactions with the catalysis of an acid (e.g., 4-toluene sulfonic acid or camphor sulfonic acid), to give the desired alcohol compounds. These compounds are, for example, but are not limited to, pentaethylene glycol acrylate, pentaethylene glycol methacrylate, or hexaethylene glycol acrylate.

The polymer of formula (I) of the present invention can be synthesized according to the process generally disclosed in U.S. Pat. No. 6,322,951, wherein an acrylate (or a methacrylate) monohydric alcohol or dihydric alcohol is first reacted with a diisocyanate to form a pre-polymer, and then at the second stage, a dihydric alcohol or an acrylate (or a methacrylate) monohydric alcohol is added to the reaction. In the presence of a catalyst (generally, an organometallic compound, which is for example, but is not limited to dibutyl tin bistridecanoate) and an antioxidant (which is for example, but is not limited to dihydroquinone, or methylhydroquinone) and a solvent (which is for example, but is not limited to butanone, dibutyl ether, butyl acetate, or toluene), the synthesis can be performed in two ways:

(1) Oligopolymerizing a dihydric alcohol having a bisphenol constituent with a diisocyanate, and subsequently combining with a monohydric alcohol having an acrylate constituent.

(2) Reacting a monohydric alcohol having an acrylate constituent with a diisocyanate, and subsequently combining with a dihydric alcohol having a bisphenol constituent.

The present invention further provides a photoimageable composition, comprising the following components:

(A) the polymer of formula (I) as defined above;
(B) a polymeric binder; and
(C) a photo initiator.

In the composition of the present invention, the amount of component (A), i.e., the polymer of formula (I), is from 5-50% by weight, preferably from 10-40% by weight, based on the total weight of the whole composition.

Component (B) of the composition of the present composition is a polymeric binder derived from an acid functional monomer and a non-acid functional monomer. The suitable acid functional monomers are not specifically limited, and are monomers known to those of ordinary skill in the art, which are, for example, but are not limited to, acrylic acid, methacrylic acid, maleic acid, fumaric acid, citric acid, 2-acrylamido-2-methylpropanesulfonic acid, 2-hydroxyethylacryloyl phosphate, 2-hydroxypropylacryloyl phosphate, and 2-hydroxy-α-acryloyl phosphate. According to a specific embodiment of the present invention, preferred acid functional monomers are acrylic acid and methacrylic acid. The polymeric binder of the present invention may contain one or more of these acid functional monomers.

According to the present invention, the non-acid functional monomer copolymerized with the acid fumctional monomer comprises acrylates, such as methyl acrylate, methyl methacrylate, hydroxyethyl acrylate, hydroxyethyl methacrylate, ethyl acrylate, ethyl methacrylate, n-butyl acrylate, n-butyl methacrylate, t-butyl acrylate, t-butyl methacrylate, n-hexyl acrylate, n-hexyl methacrylate, octyl acrylate, octyl methacrylate, 2-ethoxyethyl acrylate, 2-ethoxyethyl methacrylate, 2-ethylhexyl acrylate, 1,5-pentanediol diacrylate, N,N-diethylaminoethyl acrylate, ethylene glycol diacrylate, 1,3-propanediol diacrylate, decanediol acrylate, decanediol dimethacrylate, 1,4-cyclohexandiol diacrylate, 2,2-dimethylolpropane diacrylate, glycerol diacrylate, tripropanediol diacrylate, glycerol triacrylate, 2,2-di(p-hydroxyphenyl)-propane dimethacrylate, triethylene glycol dimethacrylate, polyoxypropyltrimethylol propane triacrylate, ethylene glycol dimethacrylate, butanediol dimethacrylate, 1,3-propanediol dimethacrylate, 1,2,4-butanetriol trimethacrylate, 2,2,4-trimethyl-1,3-pentanediol dimethacrylate, pentaerythritol trimethacrylate, 1-phenylethylene-1,2-dimethacrylate, pentaerythritol tetramethacrylate, trimethylolpropane triacrylate, 1,5-pentanediol dimethacrylate, and 1,4-benzenediol dimethacrylate; substituted or unsubstituted styrenes, such as 2-methyl styrene and vinyl toluene; or vinyl esters, such as vinyl acrylate and vinyl methacrylate. According to a specific embodiment of the present invention, preferred non-acid functional monomers are methyl acrylate, methyl methacrylate, hydroxyethyl acrylate, hydroxyethyl methacrylate, ethyl acrylate, ethyl methacrylate, n-butyl acrylate, n-butyl methacrylate, t-butyl acrylate, t-butyl methacrylate, n-hexyl acrylate, n-hexyl methacrylate, octyl acrylate, and octyl methacrylate.

In the composition of the present invention, the amount of component (B), i.e., the polymeric binder, is from 30-80% by weight, preferably from 45-75% by weight, based on the total weight of the whole composition.

Component (C) of the present composition is a photoinitiator, which can provide a free radical upon exposure to light, and initiate the polymerization via the transmission of the free radicals. The species of the photoinitiators are well known to those of ordinary skill in the art. The photoinitiators suitable for the present invention include, for example, but are not limited to, N-phenyl glycine, 9-phenylacridine, benzoins, benzyldimethylketal, 4,4'-bis(diethylamine)benzophenone, 2,4,5-triarylimidazole dimers (e.g., 2-(o-chlorophenyl)-4,5-diphenylimidazole dimer, 2-(o-chlorophenyl)-4,5-di(m-methoxyphenyl)imidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer, 2-(2,4-dimethoxyphenyl)-4,5-diphenylimidazole dimer, 2-(p-methylmercapto phenyl)-4,5-diphenylimidazole dimmer, etc.). Furthermore, suitable 9-phenylacridine homologs, for example, those disclosed in U.S. Pat. No. 5,217,845, the disclosures of which are incorporated herein by reference, are also suitable for the present invention as a photoinitiator.

Specifically, the amount of the photoinitiator is from 1.5 to 20% by weight, preferably from 2 to 15% by weight.

The composition of the invention may optionally comprise an additive, Component (D), well known to those of ordinary skill in the art, including, for example, but not being limited to, solvents (e.g., acetone, butanone, or isopropanol), dyes (e.g., Malachite Green, Crystal Violet, or Victoria Blue), stabilizers (e.g., triphenyl phosphine), auxiliaries (e.g., carboxybenzotriazole), color formers, flexibilizing agents, or fillers, or a combination thereof.

The photoimageable composition of the invention can be used as a photoresist in the manufacture of printed circuit boards. For example, a photoimageable composition layer formed from a liquid composition or transferred from a dry film is placed on the copper surface of a copper-clad board, and covered with a photomask. The photoimageable composition layer is exposed to actinic radiation, which will polymerize the monomers in the exposed area to form a cross-linked structure resistant to a developer. Moreover, the non-radiated area is developed with a diluted alkaline aqueous solution, for example, 1% aqueous sodium carbonate solution. Since the alkaline aqueous solution can promote the formation of salts with the carboxyl groups contained in the polymeric binder, the binder may become soluble and removable. After the development, the uncovered copper foil is etched and removed with an alkaline etchant, such as a mixture solution of copper-amine complex salt and aqueous ammonia, so as to form a printed circuit. Finally, the remaining photoresist layer is removed by a stripper, such as sodium hydroxide.

The present invention will be further illustrated in the following examples, which are not intended to limit the scope of the invention in any way.

EXAMPLES

Synthesis of Polyurethane Polymer A

A mixture (14.69 g) of 2,2,4-trimethyl-hexamethylene diisocyanate and 2,4,4-trimethyl-hexamethylene diisocyanate, methyl hydroquinone (0.0724 g), dibutyl tin bistridecanoate (0.0335 g), and toluene (10.00 g) were placed in a four-necked round bottom flask, into which dried air was introduced. Additionally, ethylene glycol methacrylate (9.47 g) was added dropwise into the reaction flask with stirring at room temperature. As it was exothermic during the addition, the reaction temperature was controlled below 48-52° C., and the addition time was 1 hour. After the addition of ethylene glycol methacrylate was completed, the temperature was maintained between 48-52° C. for 2 hours. Dibutyl tin bistridecanoate (0.09 g) was then added, and the bisphenol (21.40 g) having 10 ethoxy groups was added dropwise into the reaction flask over 1 hour. After the addition, toluene (2.00 g) was added. The reaction temperature would be increased slowly to 53-57° C. during the addition. After maintaining the temperature at 53-57° C. for 4 hours, the reaction was detected by an infrared spectrometer to confirm that the absorbance signals of isocyanate were absent. Isopropanol (5.00 g) was added to quench the reaction and lower the temperature of the reaction while the reaction was stirred for 30 minutes, to yield a colloidal fluid A.

Synthesis of Polyurethane Polymer B

A mixture (36.73 grams) of 2,2,4-trimethyl-hexamethylene diisocyanate and 2,4,4-trimethyl-hexamethylene diisocyanate, methyl hydroquinone (0.16 grams), dibutyl tin bistridecanoate (0.07 grams), and toluene (40.00 grams) were placed in a four-necked round bottom flask, into which dried air was introduced. Additionally, the bisphenol (53.50 grams) having 4 ethoxy groups was added dropwise into the reaction flask with stirring at room temperature. As the reaction was exothermic during the addition, the reaction temperature was controlled below 48-52° C., and the addition time was 1.5 hour. After the addition of the bisphenol having 4 ethoxy groups was completed, toluene (4.00 grams) was added and the temperature was maintained between 48-52° C. for 1.5 hours, which was then decreased to 35-40° C. Ethylene glycol methacrylate (25.95 grams) was then added into the reaction flask over 1.5 hours, after which toluene (1.00 grams) was added. After maintaining the temperature at 35-40° C. for 4 hours, the reaction was detected by an infrared spectrometer to confirm that the absorbance signals of isocyanate were absent. Isopropanol (5.00 grams) was added to quench the reaction. The reaction was stirred for 30 minutes to yield a colloidal fluid B.

Synthesis of Polyurethane Polymer C

A mixture (36.73 grams) of 2,2,4-trimethyl-hexamethylene diisocyanate and 2,4,4-trimethyl-hexamethylene diisocyanate, methyl hydroquinone (0.16 grams), dibutyl tin bistridecanoate (0.07 grams), and butyl acetate (50.00 grams) were placed in a four-necked round bottom flask, into which dried air was introduced. Additionally, the bisphenol (59.66 grams) having 10 ethoxy groups was added dropwise into the reaction flask with stirring at room temperature. As the reaction was exothermic during the addition, the reaction temperature was controlled below 48-52° C., and the addition time was 1.5 hour. After the addition of the bisphenol having 10 ethoxy groups was completed, butyl acetate (4.00 grams) was added and the temperature was maintained between 48-52° C. for 1.5 hours, which was then decreased to 35-40° C. The methacrylate (61.90 grams) having 6 ethoxy groups was then added into the reaction flask over 1.5 hours, after which butyl acetate (1.00 grams) was added. After maintaining the temperature at 35-40° C. for 6 hours, the reaction was detected by an infrared spectrometer to confirm that the absorbance signals of isocyanate were absent. Isopropanol (5.00 grams) was added to quench the reaction. The reaction was stirred for 30 minutes to yield a colloidal fluid C.

Synthesis of Polyurethane Polymer D

A mixture (36.73 grams) of 2,2,4-trimethyl-hexamethylene diisocyanate and 2,4,4-trimethyl-hexamethylene diisocyanate, dibutyl tin bistridecanoate (0.07 grams), and butyl acetate (20.00 grams) were placed in a four-necked round bottom flask, into which dried air was introduced. Additionally, the reaction product (205.49 grams) of the methacrylate having 6 ethoxy groups and ε-lactone was added dropwise into the reaction flask with stirring at room temperature. As the reaction was exothermic during the addition, the reaction temperature was controlled below 48-52° C., and the addition time was 1.5 hour. After the addition of this compound was completed, the temperature was maintained between 48-52° C. for 1 hour, which was then decreased to 35-40° C. Dibutyl tin bistridecanoate (0.24 grams) and butyl acetate (1.00 grams) were then added and bisphenol (59.66 grams) having 10 ethoxy groups was added dropwise into the reaction flask over 1.5 hours. After the addition, butyl acetate (4.00 grams) was added, and then the reaction temperature was increased slowly to 68-72° C. After maintaining the temperature at 68-72° C. for 8 hours, the reaction was detected by an infrared spectrometer to confirm that the absorbance signals of isocyanate were absent. The temperature was decreased and methyl hydroquinone (0.18 grams) and isopropanol (5.00 grams) were added to quench the reaction. The reaction was stirred for 30 minutes to yield a colloidal fluid D.

Synthesis of Polyurethane Polymer E

A mixture (36.75 grams) of 2,2,4-trimethyl-hexamethylene diisocyanate and 2,4,4-trimethyl-hexamethylene diisocyanate, dibutyl tin bistridecanoate (0.08 grams), and butyl acetate (20.00 grams) were placed in a four-necked round bottom flask, into which dried air was introduced. Additionally, the bisphenol (59.66 grams) having 4 ethoxy groups was added dropwise into the reaction flask with stirring at room temperature. As the reaction was exothermic during the addition, the reaction temperature was controlled below 48-52° C., and the addition time was 1.5 hours. After the addition of the bisphenol having 4 ethoxy groups was completed, butyl acetate (5.00 grams) was added, and the temperature was maintained between 48-52° C., for 1.5 hours, which was then decreased to 35-40° C., Dibutyl tin bistridecanoate (0.24 grams) and butyl acetate(1.00 grams) were then added and the reaction product (251.74 grams) of the methacrylate having 6 ethoxy groups and ε-lactone was added dropwise into the reaction flask over 2 hours. After the addition, the reaction temperature was increased slowly to 58-62° C., After 4 hours, the reaction was detected by an infrared spectrometer to confirm that the absorbance signals of isocyanate were absent. The temperature was decreased and methyl hydroquinone (0.18 grams) and isopropanol (5.00 grams) were added to quench the reaction. The reaction was stirred for 30 minutes to yield a colloidal fluid E.

Synthesis of Polyurethane Polymer F

Hexamethylene diisocyanate (11.10 grams), methyl hydroquinone (0.07 grams), dibutyl tin bistridecanoate (0.05 grams), and butyl acetate (30.00 grams) were placed in a four-necked round bottom flask, into which dried air was introduced. Additionally, ethylene glycol methacrylate (9.47 grams) was added dropwise into the reaction flask with stirring at room temperature. As the reaction was exothermic during the addition, the reaction temperature was controlled below 48-52° C., and the addition time was 1 hour. After the addition of ethylene glycol methacrylate was completed, butyl acetate (2.00 grams) was added, and the temperature was maintained between 48-52° C., for 2 hours. Subsequently, the bisphenol (21.40 grams) having 10 ethoxy groups was added dropwise into the reaction flask over 1 hour, during which the reaction temperature was increased slowly to 78-82° C., After the addition, butyl acetate (5.00 grams) was added and the temperature was maintained between 78-82° C., for 2 hours, after which the reaction was detected by an infrared spectrometer to confirm that the absorbance signals of isocyanate were absent. Isopropanol (5.00 grams) was added to quench the reaction and the temperature was decreased. The reaction was stirred for 30 minutes to yield a waxy solid F.

Synthesis of Polyurethane Polymer G

Hexamethylene diisocyanate (29.42 grams), methyl hydroquinone (0.16 grams), dibutyl tin bistridecanoate (0.07 grams), and butyl acetate (50.00 grams) were placed in a four-necked round bottom flask, into which dried air was introduced. Additionally, the bisphenol (59.66 grams) having 10 ethoxy groups was added dropwise into the reaction flask with stirring at room temperature. As the reaction was exothermic during the addition, the reaction temperature was controlled below 48-52° C., and the addition time was 1.5 hours. After the addition of bisphenol having 10 ethoxy groups was completed, butyl acetate (40.00 grams) was added, and the temperature was maintained between 48-52° C. for 1.5 hours, which was then decreased to 35-40° C. Subsequently, the methacrylate (67.42 grams) having 6 ethoxy groups was added dropwise into the reaction flask over 1.5 hours, after which butyl acetate (15.00 grams) was added and the temperature was maintained between 35-40° C. for 4 hours, after which the reaction was detected by an infrared spectrometer to confirm that the absorbance signals of isocyanate were absent. Isopropanol (15.00 grams) was added to quench the reaction and the reaction was stirred for 30 minutes to yield a waxy solid G.

Synthesis of Polyurethane Polymer H

Hexamethylene diisocyanate (29.42 grams), dibutyl tin bistridecanoate (0.08 grams), and butyl acetate (20.00 grams) were placed in a four-necked round bottom flask, into which dried air was introduced. Additionally, the reaction product (205.49 grams) of the methacrylate having 6 ethoxy groups and $\epsilon$-lactone was added dropwise into the reaction flask with stirring at room temperature. As the reaction was exothermic during the addition, the reaction temperature was controlled below 48-52° C., and the addition time was 1.5 hours. After the addition of this compound was completed, the temperature was maintained between 48-52° C. for 1.5 hours, which was then decreased to 35-40° C. Subsequently, dibutyl tin bistridecanoate (0.24 grams) and butyl acetate (1.00 grams) were added, and the bisphenol (59.66 grams) having 10 ethoxy groups was added dropwise into the reaction flask over 1.5 hours, after which butyl acetate (4.00 grams) was added and the reaction temperature was then increased slowly to 48-52° C. and maintained at such temperature for 5 hours, after which the reaction was detected by an infrared spectrometer to confirm that the absorbance signals of isocyanate were absent. The temperature was decreased and methyl hydroquinone (0.18 grams) and isopropanol (5.00 grams) were added to quench the reaction and the reaction was stirred for 30 minutes to yield a colloidal fluid H.

Synthesis of Polyurethane Polymer I

Hexamethylene diisocyanate (29.42 grams), dibutyl tin bistridecanoate (0.08 grams), and butyl acetate (20.00 grams) were placed in a four-necked round bottom flask, into which dried air was introduced. Additionally, the bisphenol (59.66 grams) having 4 ethoxy groups was added dropwise into the reaction flask with stirring at room temperature. As the reaction was exothermic during the addition, the reaction temperature was controlled below 48-52° C., and the addition time was 1.5 hours. After the addition of the bisphenol having 4 ethoxy groups was completed, butyl acetate (4.00 grams) was added and the temperature was maintained between 48-52° C. for 1.5 hours, which was then increased slowly to 78-82° C. Subsequently, dibutyl tin bistridecanoate (0.24 grams) and butyl acetate (21.00 grams) were added, and the reaction product (231.96 grams) of the methacrylate having 6 ethoxy groups and $\epsilon$-lactone was added dropwise into the reaction flask over 1 hour, after which the reaction temperature was maintained between 58-62° C. for 1.5 hours, after which the reaction was detected by an infrared spectrometer to confirm that the absorbance signals of isocyanate were absent. The temperature was decreased and methyl hydroquinone (0.18 grams) and isopropanol (35.00 grams) were added to quench the reaction and the reaction was stirred for 30 minutes to yield a waxy solid I.

COMPARATIVE EXAMPLES

Synthesis of Polyurethane Polymer J

Hexamethylene diisocyanate (73.20 grams) and dibutyl tin bistridecanoate (0.60 grams) were placed in a reaction flask, and then butyl acetate (36.00 grams) was added to dilute and dissolve with each other. Dried air was introduced into the flask, and the reaction temperature was controlled at 30-35° C. and the reaction was stirred for 15 minutes. Additionally, polypropylene glycol (207.30 grams) was placed in a conical flask, into which dried air was introduced. The polypropylene glycol was added dropwise, with stirring, into the reaction flask at a rate of 2.30 grams/minute. During the addition, the temperature of the reaction flask increased gradually, and the temperature was controlled to be not more than 68° C. The addition can be stopped temporarily and the reaction can be cooled if the temperature increased too fast. The addition time was 90 minutes. After the addition of polypropylene glycol was completed, the inner wall of the conical flask was washed with butyl acetate (5.60 grams), and the solution was then added dropwise into the reaction flask. The temperature of the reaction flask was controlled below 62-64° C. (which should not exceed 68° C.) to allow the reaction to conduct for 1.5 hours, after which the temperature decreased to 30-35° C. Subsequently, stearyl 3,5-di-tert-butyl-4-hydroxyhydrocinnamate (0.88 grams) and the reaction product (6.90 grams) of the methacrylate having 6 ethoxy groups and $\epsilon$-lactone were dissolved with each other, and then added dropwise into the reaction flask. Additionally, dibutyl tin bistridecanoate (0.55 grams) and the reaction product (6.90 grams) of the methacrylate having 6 ethoxy groups and $\epsilon$-lactone were dissolved with each other, and then added dropwise into the reaction flask. The reaction product (464.57 grams) of the methacrylate having 6 ethoxy groups and $\epsilon$-lactone was placed in a feeding flask, into which dried air was introduced, and added dropwise, with stirring, into the reaction flask at a rate of 3.87 grams/minute over 2 hours at a temperature of 30-35° C. (which should not exceed 38° C.). After the addition was completed, the inner wall of the conical flask was washed with butanone (10.70 grams), and the solution was then added dropwise into the reaction flask. The reaction was conducted for 1.5 hours at 30-35° C. Triethyl amine (0.90 grams) was added into the reaction flask, and the inner wall of the container was washed with butanone (2.60 grams) and then the solution was poured into the reaction flask. Subsequently, distilled water (0.90 grams) was added into the reaction flask, and the inner wall of the container was washed with butanone (2.60 grams) and then the content was poured into the reaction flask, and then the temperature of the reaction flask increased to 50-54° C., The reaction was conducted for 8.5 hours under the introduction of dried air with mechanical stirring. It was detected via the determination by an infrared spectrometer that the absorbance signals of isocyanate were absent. The temperature of the reaction flask was controlled below 30-35° C. Isopropanol (33.00 grams) was added with stirring for 1 hour to yield a colloidal fluid J.

Synthesis of Polyurethane Polymer K

Isophorone diisocyanate (IPDI) (80.00 grams), methyl hydroquinone (0.33 grams) and dibutyl tin bistridecanoate (0.17 grams) were placed in a four-necked reaction flask, into which dried air was introduced. Additionally, 2-hydroxyethyl acrylate (45.99 grams) was added dropwise into the reaction flask with stirring at room temperature. Since the reaction was exothermic during the addition, the reaction temperature was controlled below 45-50° C. After the addition of 2-hydroxyethyl acrylate was completed, the temperature was maintained between 45-50° C. for 1 hour. Subsequently, trimethylolpropane triacrylate (115.37 grams) having an ethoxy chain was added, and dibutyl tin bistridecanoate (0.50 grams) and polypropylene glycols (93.06 grams and 186.12 grams, respectively) having a molecular weight of 1,000 and 2,000, respectively, were mixed uniformly and heated slowly, and then added dropwise into the reaction flask. After the addition, the reaction temperature increased to 68-72° C. for 5 hours, after which the reaction was detected by an infrared spectrometer to confirm that the absorbance signals of isocyanate were absent. 2-Hydroxyethyl acrylate (2.72 grams) and trimethylolpropane triacrylate (20.00 grams) were mixed uniformly, and added into the reaction at 68-72° C. This temperature was maintained for 1.5 hours and then decreased to yield a colloidal fluid K.

TABLE 1

Compositions of Polyurethanes

| Polyurethane Polymer | Diisocyanate | Dihydric Alcohol | Alcohols having an Acrylate Group |
|---|---|---|---|
| A | Mixture of 2,2,4-, and 2,4,4-trimethyl-hexamethylene diisocyanate | Bisphenol (10 ethoxy groups) | Ethylene glycol methacrylate (1 ethoxy) |
| B | Mixture of 2,2,4-, and 2,4,4-trimethyl-hexamethylene diisocyanate | Bisphenol (4 ethoxy groups) | Ethylene glycol methacrylate (1 ethoxy) |
| C | Mixture of 2,2,4-, and 2,4,4-trimethyl-hexamethylene diisocyanate | Bisphenol (10 ethoxy groups) | Methacrylate (6 ethoxy groups) |
| D | Mixture of 2,2,4-, and 2,4,4-trimethyl-hexamethylene diisocyanate | Bisphenol (10 ethoxy groups) | Methacrylate (6 ethoxy groups) + caprolactone |
| E | Mixture of 2,2,4-, and 2,4,4-trimethyl-hexamethylene diisocyanate | Bisphenol (4 ethoxy groups) | Methacrylate (6 ethoxy groups) + caprolactone |
| F | hexamethylene diisocyanate | Bisphenol (10 ethoxy groups) | Ethylene glycol methacrylate (1 ethoxy) |
| G | hexamethylene diisocyanate | Bisphenol (10 ethoxy groups) | Methacrylate (6 ethoxy groups) |
| H | hexamethylene diisocyanate | Bisphenol (10 ethoxy groups) | Methacrylate (6 ethoxy groups) + caprolactone |
| I | hexamethylene diisocyanate | Bisphenol (4 ethoxy groups) | Methacrylate (6 ethoxy groups) + caprolactone |
| J | hexamethylene diisocyanate | Polypropylene glycol | Methacrylate (6 ethoxy groups) + caprolactone |
| K | isophorone diisocyanate | Polypropylene glycol | Acrylate (1 ethoxy) |

Characterization Test:

The photoimageable compositions having the following constituents were prepared (see Table 2):

TABLE 2

Constituents of Photoimageable Composition (Colloidal Fluids i~xii)

| | | | Photoimageable Composition (grams) | | | | | | | | | | | |
|---|---|---|---|---|---|---|---|---|---|---|---|---|---|---|
| | | | i | ii | iii | iv | v | vi | vii | viii | ix | x | xi | xii |
| (a) Polymeric Binder | Acrylic Polymer | | 52.90 | 52.90 | 52.90 | 52.90 | 52.90 | 52.90 | 52.90 | 52.90 | 52.90 | 52.90 | 52.90 | 52.90 |
| (b) Polyurethane | Example | A | — | 5.20 | — | — | — | — | — | — | — | — | — | — |
| | | B | — | — | 5.20 | — | — | — | — | — | — | — | — | — |
| | | C | — | — | — | 5.20 | — | — | — | — | — | — | — | — |
| | | D | — | — | — | — | 5.20 | — | — | — | — | — | — | — |
| | | E | — | — | — | — | — | 5.20 | — | — | — | — | — | — |
| | | F | — | — | — | — | — | — | 5.20 | — | — | — | — | — |

TABLE 2-continued

Constituents of Photoimageable Composition (Colloidal Fluids i~xii)

| | | | \multicolumn{12}{c}{Photoimageable Composition (grams)} | | | | | | | | | | | |
|---|---|---|---|---|---|---|---|---|---|---|---|---|---|---|
| | | | i | ii | iii | iv | v | vi | vii | viii | ix | x | xi | xii |
| | | G | — | — | — | — | — | — | — | 5.20 | — | — | — | — |
| | | H | — | — | — | — | — | — | — | — | 5.20 | — | — | — |
| | | I | — | — | — | — | — | — | — | — | — | 5.20 | — | — |
| | Comparative | J | — | — | — | — | — | — | — | — | — | — | 5.20 | — |
| | Example | K | — | — | — | — | — | — | — | — | — | — | — | 5.20 |
| (c) Non-acid Functional Monomers | Trimethylol propane Triacrylate | | 11.09 | 11.09 | 11.09 | 11.09 | 11.09 | 11.09 | 11.09 | 11.09 | 11.09 | 11.09 | 11.09 | 11.09 |
| (d) Photo-initiator | 4,4'-bis(diethyl-amine)benzophenone | | 0.06 | 0.06 | 0.06 | 0.06 | 0.06 | 0.06 | 0.06 | 0.06 | 0.06 | 0.06 | 0.06 | 0.06 |
| | 2-(o-chlorophenyl)-4,5-diphenyl-imidazole dimer | | 1.35 | 1.35 | 1.35 | 1.35 | 1.35 | 1.35 | 1.35 | 1.35 | 1.35 | 1.35 | 1.35 | 1.35 |
| | Phenyl Glycine | | 0.01 | 0.01 | 0.01 | 0.01 | 0.01 | 0.01 | 0.01 | 0.01 | 0.01 | 0.01 | 0.01 | 0.01 |
| (e) Dye | Malachite Green and Crystal Violet | | 0.21 | 0.21 | 0.21 | 0.21 | 0.21 | 0.21 | 0.21 | 0.21 | 0.21 | 0.21 | 0.21 | 0.21 |
| (f) Additives | Triphenyl Phosphine | | 0.004 | 0.004 | 0.004 | 0.004 | 0.004 | 0.004 | 0.004 | 0.004 | 0.004 | 0.004 | 0.004 | 0.004 |
| | Carboxybenzo-triazole | | 0.004 | 0.004 | 0.004 | 0.004 | 0.004 | 0.004 | 0.004 | 0.004 | 0.004 | 0.004 | 0.004 | 0.004 |
| (g) Solvent | Butanone | | 4.28 | 4.28 | 4.28 | 4.28 | 4.28 | 4.28 | 4.28 | 4.28 | 4.28 | 4.28 | 4.28 | 4.28 |

All the mixtures for the photoimageable compositions were prepared with a solids content of about 45~60%. The colloidal fluids were coated onto a biaxially stretched and oriented 80 tacticity polyester film, and dried to the extent that about 1% or less of the amount of the solvent lest. Thereafter, the coated photoimageable compositions were laminated onto a copper-coated composite plate of 1 ounce/FR-4/1 ounce pretreated by swabbing mechanically, by using a hot-roller laminator at 110° C. at a rate of 1.5 m/min. After the above treatment, the laminated composite plate was placed on a UV exposure machine for imaging by exposing the plate to a strength-regulated energy through a suitable optical instrument, thus obtaining different copper steps measurable with a Stouffer® 21 wedge. Next, the exposed composite plate was developed with 0.85% sodium carbonate solution at 28° C. sprayed at about 24~26 psi through a spray coating developer driven by a conveyor, the retention time of which was adjusted to the point which allowed the composite plate to be developed at 50~55%. Thereafter, the plate was spray washed for several times with tap water and deionized water.

A number of copper-coated composite plates with orifices having different sizes were employed for the tensile test. Under the above conditions, the coated photoimageable compositions were laminated onto both upper and lower sides of the copper-coated composite plates with a hot roller laminator, and exposed with a strength-regulated energy to obtain imaged objects of 22 copper step measured with a Stouffer® 41 wedge. After the development as described above, the plates were tested under the conditions that the force was 0.1 N and the rate was 100 mm/min.

In the alkaline etching test, the coated photoimageable compositions were laminated onto a copper-coated composite plate of 1 ounce/FR-4/1 ounce pretreated by swabbing mechanically by using a hot roller laminator under the above conditions. The laminated composite plate was then placed on a UV exposure machine for imaging by exposing to a strength-regulated energy through a suitable optical instrument, thus obtaining an imaged object with a copper-step of 22 as measured with a Stouffer® 41 wedge. Thereafter, the plate was cut into the desired test pieces after being treated with the above development. Next, the alkaline etching solution used to etch copper was adjusted to pH 9.5 with aqueous ammonia, into which the previous cut test pieces were immersed at the temperature of 50° C. for 2 minutes, and then these pieces were taken out rapidly and washed with a large amount of water and blew to dry. Thereafter, the remaining finest photoresist circuits attached on the copper surface were observed with a microscope.

In the gold plating test, the coated photoimageable compositions were laminated onto a copper-coated composite plate of 1 ounce/FR-4/1 ounce pretreated by microetching chemically and swabbing mechanically, by using a hot roller laminator under the above conditions. The laminated composite plate was then placed on a UV exposure machine for imaging by exposing to a strength-regulated energy through a suitable optical instrument. Thereafter, the plate was cut into the desired test pieces after being treated with the above development. Next, the gold plating test was performed for 6 min on the cut test pieces at pH=6.0 and the temperature of 65° C., with the gold plating solution (NT-1000, provided by Auromex Co.) at the gold concentration of $[Au^+]=4$ g/L (the current density: about 15 ASF).

In the electroless nickel plating immersion gold test, the coated photoimageable compositions were laminated onto a copper-coated composite plate of 1 ounce/FR-4/1 ounce pretreated by microetching chemically and swabbing mechanically, by using a hot roller laminator under the above conditions. The laminated composite plate was then placed on a UV exposure machine for imaging by exposing with a strength-regulated energy through a suitable optical instrument, and then cut into the desired test pieces after being treated with the above development. The tests includes the following two parts: (a) Electroless nickel plating: it was performed for 60 min on the previously cut test pieces at the temperature of 85° C., with the electroless nickel plating bath solution (NIMU-DEM NPR-4, provided by KAMIMURA Co.); (b) Immersion gold: the immersion gold test was performed for 15 min on the test pieces which had been tested in the electroless nickel plating test, with the immersion gold plating bath solution (AURICAL TTT-24, provided by KAMIMURA Co.).

The results of these tests are shown in Table 3.

TABLE 3

Properties of Colloidal Fluids i~xii

| | Photoimageable Composition | | | | | | | | | | | |
|---|---|---|---|---|---|---|---|---|---|---|---|---|
| | i[a] | ii[b,e] | iii[b,e] | iv[b,e] | v[b,d] | vi[b,d] | vii[b,e] | viii[b,e] | ix[b,d] | x[b,d] | xi[c,d] | xii[c,e] |
| 21 Wedge/41 Wedge | 7/21 | 8/22 | 7/20 | 8/24 | 6/18 | 6/18 | 7/20 | 8/22 | 7/19 | 7/20 | 7/22 | 7/19 |
| Circuit Adhesion | 24 microns | 22 microns | 24 microns | 20 microns | 18 microns | 24 microns | 24 microns | 22 microns | 22 microns | 22 microns | 22 microns | 22 microns |
| Circuit Resolution | 28 microns | 26 microns | 24 microns | 24 microns | 22 microns | 24 microns | 26 microns | 24 microns | 20 microns | 22 microns | 26 microns | 26 microns |
| Tensile Capacity Tensile Strength(g/mm$^2$) | 380.48 | 450.33 | 466.75 | 479.30 | 671.81 | 651.63 | 446.84 | 469.15 | 699.40 | 690.11 | 639.66 | 441.82 |
| Elongation(mm) | 1.23 | 2.08 | 2.10 | 2.13 | 2.83 | 2.83 | 2.07 | 2.11 | 2.99 | 2.97 | 2.53 | 1.86 |
| Thin line adhesion of alkaline etching | >100 microns | 90 microns | 90 microns | 80 microns | 70 microns | 80 microns | 80 microns | 80 microns | 70 microns | 70 microns | 90 microns | >100 microns |
| Gold plating capacity[f] | stripped | pass | pass | pass | pass | pass | pass | pass | pass | pass | stripped | stripped |
| Electroless nickel plating capacity[f] | stripped | pass | pass | pass | pass | pass | pass | pass | pass | pass | stripped | stripped |
| Immersion gold capacity[f] | stripped | pass | pass | pass | pass | pass | pass | pass | pass | pass | stripped | stripped |

Notes:
[a]without adding polyurethane
[b]containing polyurethanes that have a bisphenol constituent
[c]not containing polyurethanes that have a bisphenol constituent
[d]containing polyurethanes that have a polyester chain constituent
[e]not containing polyurethanes that have a polyester chain constituent
[f]pass: not stripped The test results show that colloidal fluids ii~x have better capacities of alkaline etching resistance and gold plating resistance than those of colloidal fluid i, colloidal fluid xi, and colloidal fluid xii, and obtain a better resolution when developed in the aqueous alkaline solution due to their better alkaline resistance. Meanwhile, it can be found from the test results regarding physical properties that the photoimageable compositions will have better capacities of gold plating resistance and electroless nickel plating immersion gold resistance when the compositions contain polyurethanes that have a bisphenol constituent, and that it can be concluded that the photoimageable compositions of the present invention exhibit a good capacity of alkaline etching resistance due to the presence of a benzene ring structure; and if the polyurethane contains a polyester chain constituent, the photoimageable compositions of the present invention exhibit a better tensile capacity. As evidenced from the test results, colloidal fluid v and colloidal fluids ix~xi are all better than those polyurethane colloidal fluids without a polyester chain constituent, whereas colloidal fluid xii is poorer in the capacities of tensile, gold plating resistance, electroless nickel plating immersion gold resistance, and alkaline etching resistance because it does not contain a bisphenol and polyester chain constituents.

We claim:

1. A polymer having the formula (I),

I

[structural formula shown]

wherein:
  $R_1$ is hydrogen or methyl;
  $R_2$ is $C_{2-4}$ alkyleneoxy;
  $R_3$ is $C_{3-10}$ lactone residue;
  $R_4$ is $C_{1-20}$ alkylene;
  $R_5$ is $C_{2-4}$ alkyleneoxy;
  $R_6$ is hydrogen or $C_{1-6}$ alkyl;
  n is 1 or an integer greater than 1;
  a is an integer from 1 to 10;
  b is an integer from 1 to 20; and
  c is an integer from 1 to 10;
wherein the polymer has an average molecular weight between 5,000 and 8,000.

2. The polymer according to claim 1, wherein a is an integer from 1 to 7.

3. The polymer according to claim 1, wherein b is an integer from 4 to 15.

4. The polymer according to claim 1, wherein n is an integer from 1 to 20.

5. The polymer according to claim 1, wherein $R_2$ is $C_{2-3}$ alkyleneoxy.

6. The polymer according to claim 1, wherein $R_3$ is $C_{3-7}$ lactone residue.

7. The polymer according to claim 1, wherein $R_4$ is $C_{4-16}$ alkylene.

8. The polymer according to claim 1, wherein $R_5$ is $C_{2-3}$ alkyleneoxy.

9. A photoimageable composition, comprising the following components:
- (A) the polymer of formula (I) as defined in claim 1;
- (B) a polymeric binder; and
- (C) a photoinitiator.

10. The composition according to claim 9, wherein the polymer comprises about 5% to about 50% of the total weight of the photoimageable composition.

11. The composition according to claim 9, wherein the polymeric binder comprises about 30% to about 80% of the total weight of the photoimageable composition.

12. The composition according to claim 9, wherein the photoinitiator comprises about 1.5% to about 20% the total weight of the photoimageable composition.

13. The composition according to claim 9, wherein the polymeric binder comprises an acid functional monomer and a non-acid functional monomer as the polymerized units.

14. The polymer according to claim 1, wherein $R_6$ is methyl.

* * * * *